US010186089B2

(12) United States Patent
Garcia et al.

(10) Patent No.: US 10,186,089 B2
(45) Date of Patent: Jan. 22, 2019

(54) INFORMATIONAL VISUAL DISPLAY FOR VEHICLES

(71) Applicant: Faraday & Future Inc., Gardena, CA (US)

(72) Inventors: Mario R. Garcia, Long Beach, CA (US); Matthew Joseph Coburn, Redondo Beach, CA (US); Peter G. Kappas, Long Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/663,564

(22) Filed: Jul. 28, 2017

(65) Prior Publication Data

US 2018/0158255 A1 Jun. 7, 2018

Related U.S. Application Data

(60) Provisional application No. 62/368,868, filed on Jul. 29, 2016.

(51) Int. Cl.

| | |
|---|---|
| ***G07C 5/00*** | (2006.01) |
| ***G07C 5/08*** | (2006.01) |
| ***G06F 17/30*** | (2006.01) |
| *G06K 7/10* | (2006.01) |
| *G06K 7/14* | (2006.01) |

(52) U.S. Cl.

CPC ....... *G07C 5/008* (2013.01); *G06F 17/30879* (2013.01); *G07C 5/0825* (2013.01); *G06K 7/10762* (2013.01); *G06K 7/1417* (2013.01)

(58) Field of Classification Search

CPC ................................................ G06F 17/30879
USPC ......................................................... 340/472
See application file for complete search history.

(56) References Cited

U.S. PATENT DOCUMENTS

| | | | | |
|---|---|---|---|---|
| 6,268,793 | B1 * | 7/2001 | Rossi | B60Q 1/302 340/436 |
| 2002/0195490 | A1 * | 12/2002 | Gehlot | B60R 13/10 235/384 |
| 2013/0006775 | A1 * | 1/2013 | Jordan | G08G 1/20 705/14.62 |
| 2015/0025975 | A1 * | 1/2015 | Wallach | G06Q 30/0266 705/14.63 |
| 2015/0280788 | A1 * | 10/2015 | Ryu | H04B 5/0031 455/41.1 |
| 2016/0023665 | A1 * | 1/2016 | Sherony | B60W 50/12 701/2 |
| 2017/0169648 | A1 * | 6/2017 | Penilla | G07F 15/005 |

* cited by examiner

*Primary Examiner* — Omar Casillashernandez
(74) *Attorney, Agent, or Firm* — Veros Legal Solutions, LLP

(57) ABSTRACT

An information display includes a display screen on a vehicle. The display screen is configured to display visual information based on a vehicle mode in which the vehicle is operating. The display screen can display instructions to connect to a communications interface of the vehicle. The vehicle operates in a vehicle mode based on occurrence of one or more events associated with the vehicle.

14 Claims, 7 Drawing Sheets

120

110

INFORMATIONAL VISUAL DISPLAY FOR VEHICLES

CROSS-REFERENCE TO RELATED APPLICATIONS

This application claims the benefit of U.S. Provisional Application No. 62/368,868, filed Jul. 29, 2016, the entirety of which is hereby incorporated by reference.

TECHNICAL FIELD

The disclosed technology relates generally to the field of vehicles. More specifically, the disclosed technology relates to apparatus and methods for visually displaying information relating to a vehicle.

BACKGROUND

Motor vehicles have become an integral aspect of our daily lives as they provide us with on-demand mobility, independence, and convenience. While rapid advancements in automobile technology further enhance our reliance and reliability on our vehicles, the ever-changing interior and mechanical designs make it difficult for emergency personnel or general technicians to quickly assess or stabilize the vehicle in a safe and effective manner.

This is especially true in instances where the vehicle is involved in a serious accident and every second counts in collecting all the vehicle information necessary to stabilize or rescue any injured occupants still located within the vehicle, such as vehicle type, location of airbags, battery, tanks, electric cables, high-pressure cylinders, and other components. Similar information may also be required when a vehicle technician is unfamiliar with the specific hardware when attempting to assess and repair the vehicle.

BRIEF SUMMARY OF EMBODIMENTS

Various embodiments of the disclosed technology include an information display for a vehicle. The informational display system may include a display screen configured to display visual information based on a vehicle mode in which the vehicle is operating. The vehicle operating in a particular vehicle mode may be based on the occurrence of one or more particular events associated with the vehicle. The display screen may be visible from an area exterior to the vehicle.

In other embodiments, a vehicle may include a display screen that is carried by a vehicle body. The display screen may be configured to display visual information based on a vehicle mode in which the vehicle is operating. The vehicle operating in a particular vehicle mode may be based on one or more particular events associated with the vehicle. The visual information may further be presented on a display screen that is visible from a location exterior to the vehicle.

In further embodiments, a method for displaying vehicle information is presented. The method may include determining a vehicle mode in which a vehicle is operating. The vehicle operating in a particular vehicle mode may be based on the occurrence of one or more particular events associated with the vehicle. In some instances, the method may also include presenting visual information on a display screen based on the vehicle mode in which the vehicle is operating. The display screen may be installed on the vehicle so that the visual information presented on the display screen is visible from a location exterior to the vehicle.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
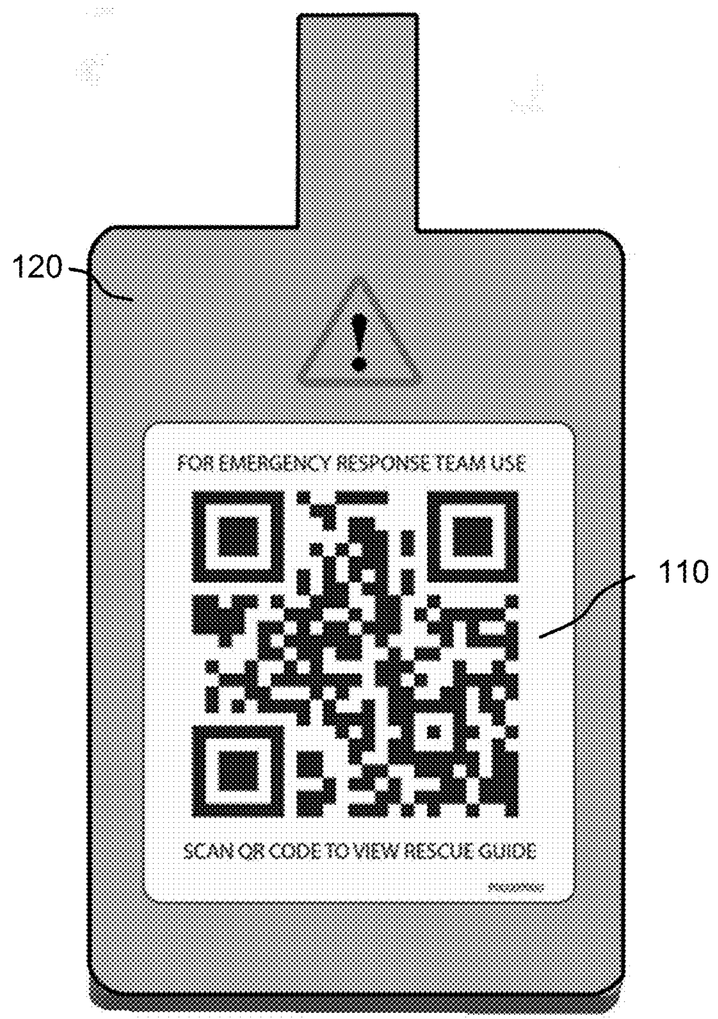
FIG. 1 illustrates a matrix bar code presented on a display screen according to one embodiment of the present disclosure.

The following description is not to be taken in a limiting sense, but is made merely for the purpose of describing the general principles of the disclosed embodiments. The present embodiments address the problems described in the background while also addressing other additional problems as will be seen from the following detailed description. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Some embodiments of the disclosure provide a vehicle display platform to provide a viewer with important vehicle information. In some instances, the vehicle display platform may include a display screen affixed to the vehicle. The display screen which may present specific information associated with the vehicle's current situation, or otherwise known as its operating mode. Different vehicle operating modes may include a drive mode, a rescue mode, a repair mode, and/or other modes as would be appreciated by one of ordinary skill in the art upon studying this disclosure. In some embodiments, the display screen may present instructions on how to connect an electronic device (e.g., a portable electronic device) to the vehicle, and the specific information associated with the vehicle's current situation, or operating mode, can be displayed on the electronic device. In some embodiments, the portable electronic device can be configured to accept user input.

Specific information associated with the vehicle's particular operating mode may be displayed on the display screen. For example, during a drive mode, information associated with the car's driving and maintenance history may be presented, which may include the vehicle's mileage history, gas calculator, oil change information, and the like.

In other instances, when/after the car is involved in a collision or accident, the vehicle may be operating in a rescue mode. When the vehicle is operating in a rescue mode, the display screen may present information helpful to an emergency responder approaching the vehicle. Such information may include vehicle schematics highlighting the location of the fuel tank, fuel lines, and other potentially explosive powered elements within the vehicle that may need to be deactivated or avoided when cutting through or stabilizing the vehicle. Immediately and reliably providing accessible information to emergency responder may allow them to effectively provide assistance without having to guess certain features or wait for confirmation of vehicle information, thus saving valuable time.

In other instances, where the vehicle has mechanical and/or electrical issues that require the need of a technician, the vehicle may be operating in a repair mode. The information presented while the vehicle is operating in a repair mode may include those that may be helpful to technicians when diagnosing and/or repairing problems with the vehicle. Such information may include towing instructions, jump start instructions, battery replacement instructions, restart instructions, vehicle schematics, and the like.

In some embodiments, the display screen may include visual information that includes a bar code. The bar code may store data and then display the data in a visually appealing manner when scanned by a portable electronic device with a built-in bar code scanner or camera. The bar code may be a two-dimensional pattern, also known as a matrix bar code. A matrix bar code is a two-dimensional pattern, where information can be stored and encoded into the two-dimensional pattern as text or a numerical data set. Because the matrix bar code can efficiently store data, the matrix bar code may be used as a medium to store particular vehicle information specific to each vehicle type the matrix bar code is displayed onto. Once the matrix bar code is scanned, the information stored in the matrix bar code may be displayed on the portable electronic device used to scan the matrix bar code, which may allow the stored information to be accessible to multiple people and devices at one time. This may be particularly useful since the display screen size on the vehicle may be limited, making it potentially difficult for the viewer to read the information on the display screen. In some embodiments, the bar code may store a link to a website or information stored on a server connected to the Internet. The electronic device can scan the bar code, and access the website or information stored on the server through the link. The website or the information stored on the server may include the rescue and/or diagnosis information as described in this disclosure. The website or the information stored on the server may include additional information, such as more detail information on the vehicle, vehicle's owner, frequent occupants, etc.

In other instances, the visual display may directly publish or present the vehicle information directly onto the visual display of the vehicle so that there is no need to push or transfer the information onto a separate portable electronic device. This may be particularly helpful when the information presented is relatively concise, where the information is easily and sufficiently viewable on the display screen attached to the vehicle. In some instances, the display screen itself may be interactive where the display screen is a touch-sensitive screen. The viewer may select particular inputs (e.g., touch screen buttons) to choose which information the viewer may wish to see on the display screen.

FIG. 1 illustrates a matrix bar code 110 presented on a display screen 120 according to one embodiment of the present disclosure. The display screen 120 may be located on the interior or exterior sections of the vehicle so that the information presented is readily accessible to anyone within the vicinity of the vehicle who may have an interest in attaining access to such information.

The display screen 120 may include an electronic visual display system, such as a liquid-crystal display (hereinafter "LCD") panel to present information to the viewer with light modulating properties. The LCD panel may be connected to the electrical wirings of the vehicle so that it utilizes and consumes energy from the vehicle's power source. The LCD panel may power on when the information is to be made visible on the display screen 120. In some instances, the LCD panel of the display screen 120 may require a certain minimum amount of power to turn on and display the necessary information. In the instance that the vehicle with the display screen 120 is involved in a major collision where the vehicle's main power source is offline, a back-up power source may be utilized so that the display screen 120 may still have access to an emergency power supply. Such back-up power sources may include a solar panel or back-up battery attached to the display screen 120.

To conserve energy, the display screen 120 may enter in a power saving state, otherwise known as sleep mode, which may be achieved by cutting all unneeded power to the LCD panel and by operating only at minimum power. Another power saving option is to only consume power when the screen changes its display, so that static text and images can be held on a screen without using any power or electricity. This can be achieved using electronic paper for the display screen, which also enhances reading quality by reflecting light like paper instead of emitting light like most conventional backlit flat panel displays. This makes the display screen 120 more comfortable to read and may even provide a wider viewing angle than most light-emitting displays since words and drawings can be read in direct sunlight without the image appearing to fade.

Additionally, when the display screen is not in use or is in sleep mode, the color of the display screen may be the same color of the interior or exterior surface of the vehicle or the surface of its direct surroundings when the display screen 120 is not presenting information. Thus, the display screen 120 may not be noticeable when not in use, preserving the aesthetic design or color scheme of the vehicle.

To have the display screen awaken from sleep mode or to begin displaying the necessary vehicle information, the display screen 120 may be activated manually, such as responses to user control. This may include activation upon a user's touch of the touch-sensitive display screen 120 or activation from the user's smartphone or other electronic device connected to the vehicle and/or display screen 120 via Bluetooth, wireless connection, or direct connection with the vehicle's electrical wiring or computer network.

In other instances, the display screen 120 may display certain information when responding to certain logic events or commands issued from the vehicle's onboard computer network or electrical system. The logic events may be dependent upon the specific vehicle mode that are triggered by the recognition of certain events associated with the vehicle, as will be discussed in further detail below.

Based on the determined vehicle mode, the display screen 120 may present a matrix bar code 110 to be scanned by a portable electronic device. Such portable electronic devices may include smart phones, tablets, bar code readers, and the like. Each matrix bar code 110 design is unique because each will store different information to be scanned and displayed on the display screen 120. Thus, particular matrix bar codes 110 may be presented on the display screen 120 depending on the current environment and situation of the vehicle detected by the various vehicle sensors. Once the vehicle mode is determined at certain circumstances, the vehicle's onboard computer network may then command the display screen 120 to present the appropriate information on the display screen 120.

For example, as illustrated in FIG. 1, the selected matrix bar code 110 is displayed when the vehicle is in rescue mode, where the matrix bar code 110 contains helpful vehicle information to be scanned by emergency responders. Rescue mode is when the vehicle detects environmental or vehicle conditions that likely indicate that the vehicle is involved in a collision or a serious accident. The many vehicle sensors may be able collect data and arrive to such conclusions when the sensors detect these exemplary conditions: sudden and abrupt deceleration or braking, yaw and roll of the vehicle, sudden jerk in steering wheel, deployment of air bags, sudden impact to the car, and the like. In the instance the such conditions are sensed and recognized, the onboard vehicle computer network may prompt the display screen 120 to be powered on or activated to display the matrix bar code 110 containing helpful information for rescuing occupants from a vehicle. Such information may essentially include a rescue sheet specific for each vehicle type, which may provide vehicle design details emergency responders may need to know in order to cut or saw through the vehicle to safely gain access to injured occupants within the vehicle. Having such access to important and accurate vehicle information readily and easily may allow emergency responders to quickly take action without needing to guess or wait for confirmation, thus saving significant time and potentially lives.

Figure 2:
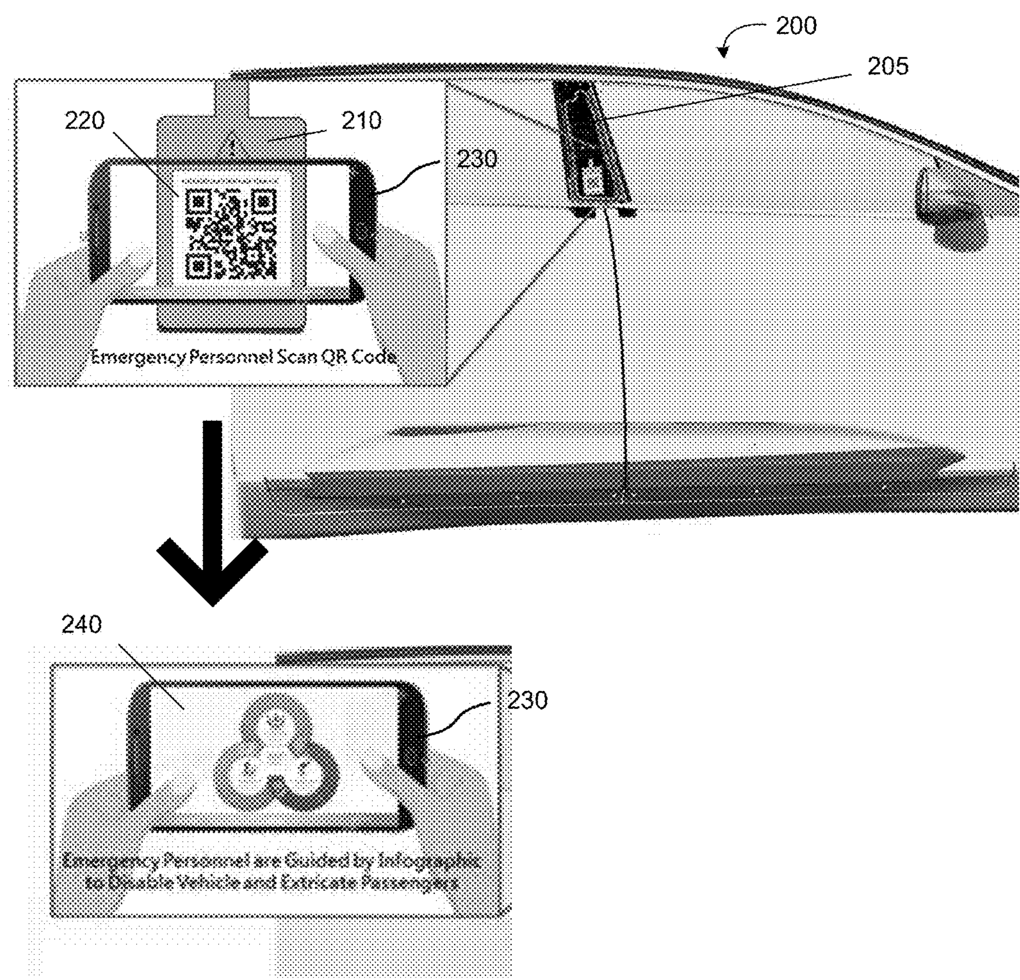
FIG. 2 illustrates a display screen on a side frame structure of a vehicle and a matrix bar code, presented on the display, to be scanned by a portable electrical device according to one embodiment of the present disclosure.

FIG. 2 illustrates a display screen 210 on a side frame structure 205 of a vehicle 200 and a matrix bar code 220 to be scanned by a portable electrical device according to one embodiment of the present disclosure. The display screen 210 may be located on areas of the vehicle 200 where the display screen 210 is viewable from an area or location outside the vehicle 200, so that persons other than the driver or passenger may be able to readily access the information presented on the display screen 210. By way of example, the display screen 210 may be placed on the exterior portions of a vehicle's side frame structure 205, such as the B pillar support, where the side frame structure 205 divides the driver and the front passenger side windows from the rear passenger side windows. In other instances, the display screen 210 may be placed in other easily viewable areas outside the vehicle 200, such as the A pillar supports on opposite sides of the car, trunk, fuel cap cover, side doors, and the like.

In some embodiments, a protective screen or film may cover the display screen 210. The protective screen or film may be made of material that includes plastic, vinyl, acrylic, tempered glass to protect the display screen 210 from the environment conditions that may damage the display screen 210. The protective screen or film may be transparent and preserve the display screen's 210 touch screen capabilities even when the protective screen or film is placed over the display screen 210. In other instances, the protective screen may be a cap or a cover that may be removed to access the surface of the display screen 210.

However, the display screen 210 is not limited for display in only exterior areas of the vehicle. Instead, the display screen 210 may also be placed anywhere within the interiors areas of the vehicle, or cabin, where the information on the display screen 210 may still be viewable to a person outside the vehicle 200. In such instances, the matrix bar code 220 may still be scanned from outside the vehicle 200. Such areas may include the top panel area, cover board of the dashboard, or inner surface of the B pillar support. In other instances, the display screen 210 may simply be placed anywhere within the interior sections of the cabin that it is more easily accessible to the occupants of the vehicle 200, such as the sun visor flap, seat belt strap, car seat, trunk space, glove compartment area, or any other location as would be appreciated by one of ordinary skill in the art upon studying this disclosure. In some other embodiments, the vehicle may have multiple display screens 210, placed at different locations. In some further embodiments, the vehicle may have display screens for displaying information, like a display screen for control panel, a display screen for entertainment, etc. These display screens can be configured to function as the display screen 210.

As further depicted, the display screen 210 may include a matrix bar code 220 to be scanned by a portable electronic device 230. The matrix bar code 220 may be any two-dimensional bar code consisting of cells or modules arranged in pattern to store encoded information. In some instances, the matrix barcode 220 is a quick response ("QR") code, which is a type of matrix barcode that uses four standardized encoding modes to efficiently store data. The matrix bar code 220 may have a wide range of information stored, in which different information is made available depending on when the information is to be displayed on the display screen 210.

When the matrix bar code 220 is scanned, the information stored within the matrix bar code may then be displayed on the select portable electronic device 230. In some instances, the information displayed may be presented in the format of graphic visual representations 240 so that the information can be presented quickly and clearly, which may prove to be particularly helpful in emergency situations where the information needs to be conveyed quickly and effectively. The graphic visual representations 240 may provide a step-by-step guide to convey the necessary instructive information stored in the matrix barcode 220. In other instances, the information may be presented in the format of a video, web page, picture, audio, or text.

As such, the matrix bar code 220 containing such information may appear on the display screen 210 when the vehicle is in rescue mode. Currently, emergency responders have to make educated guesses based on prior experience as to the interior mechanical and/or electrical systems of the vehicle, especially when locating particular dangerous systems that need to be deactivated before the rescue can be further attempted. Such devices may include airbags, impact zones, seat belts, fuel tanks, restraints, batteries, and the like. But, with the presented vehicle display screen 210, emergency responders may approach a vehicle 200 with knowledge of the vehicle's exact specification and internal layout, which may significantly minimize any risks and allow emergency responders to more quickly stabilize the vehicle when attempting to remove trapped passengers in the vehicle. This is especially helpful considering that modern vehicles are all designed differently, with not only aesthetic differences, but also with interior mechanical differences along with their placements inside the vehicle 200.

Other information that may be helpful for emergency responders may include vehicle history information, which may give emergency responders a greater idea as to what and how the accident occurred. Such information may include number of airbags deployed, impact data location, speed of car before collision, number of passengers, and the like. Such information may further allow emergency responders to obtain a better idea as to the damage of the vehicle 200 as well as the injuries likely sustained by the occupants. In some embodiments, more than one matrix bar code 220 may be presented on the display screen 210 to provide emergency responders with various vehicle information.

Figure 3:
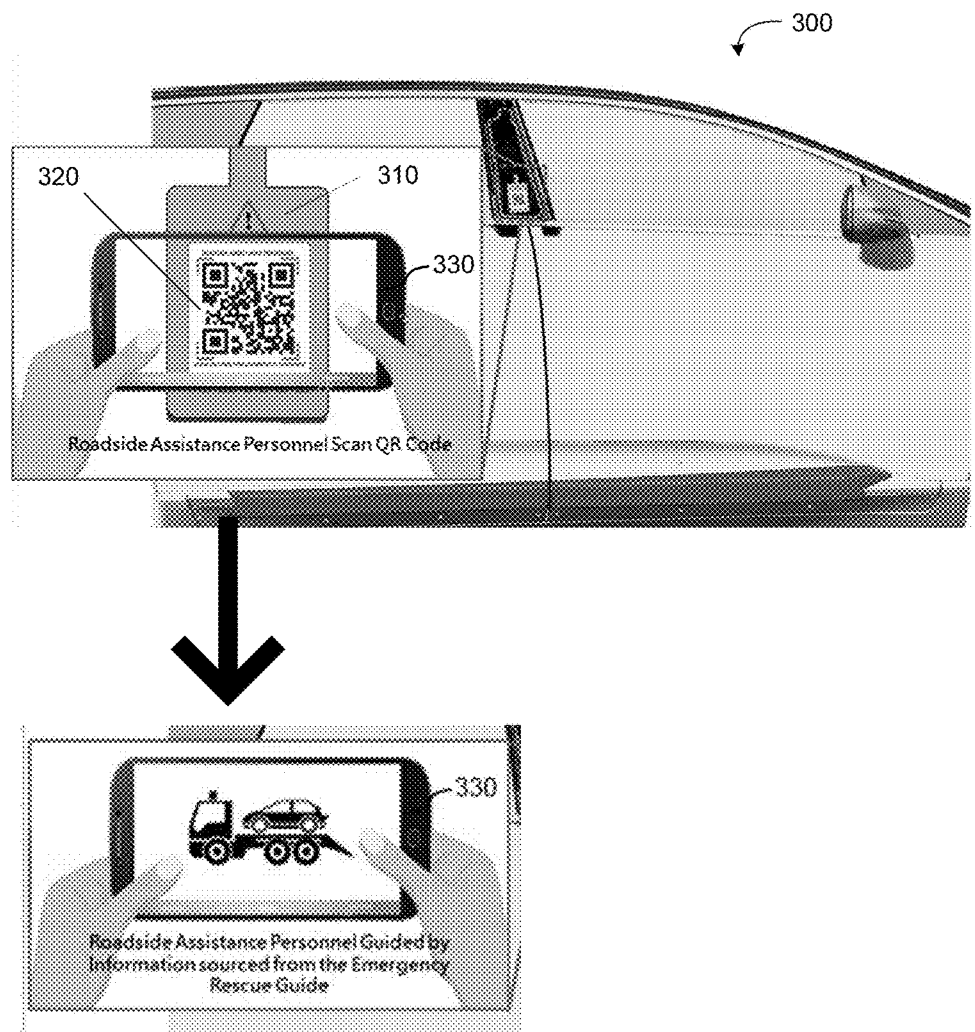
FIG. 3 illustrates a display screen on a side structure of a vehicle and a matrix bar code, presented on the display screen, to be scanned by a portable electrical device according to one embodiment of the present disclosure.

As depicted in FIG. 3, the information stored in the matrix bar code 320 may contain vehicle information displayed on a portable electronic device 330 according to one embodiment of the present disclosure. In some instances, scanning the matrix bar code 320 with the portable electronic device 330 may display vehicle information that may be beneficial in aiding road side technicians to stabilize or prepare the vehicle for towing. Because modern vehicles have internal mechanical components that may be positioned in different areas throughout the vehicle 300, this makes it more difficult for mechanics or technicians unfamiliar with the vehicle design to quickly assess the condition of the vehicle 200.

As such, the display screen 310 may display a matrix bar code 320 containing helpful vehicle troubleshooting information when the vehicle 300 detects a mechanical and/or electrical issue, in which the vehicle 300 may trigger the vehicle 300 to be in repair mode. The onboard vehicle computer and its sensors may detect vehicle conditions that may indicate the presence of a mechanical and/or electrical issue. Exemplary indicators may include low pressure tires, engine malfunction, coolant temperature warning, transmission temperature, low batteries, security alert, service update, reduced power warning, oil pressure warning, and the like. Thus, when the vehicle is presented with these troubleshooting occurrences, the vehicle's onboard computer network may recognize that it is operating at a repair mode and signal the display screen 310 to publish the matrix bar code 320 with the vehicle's diagnostic or troubleshooting information. Thus, when the roadside assistance or technician scans the matrix bar code 320 with a portable electronic device 330, the vehicle's diagnostic or troubleshooting information encoded in the matrix bar code 320 may be displayed on the portable electronic device 330.

By way of example, the type of information that may be displayed includes the external and internal schematics of the vehicle so that the vehicle technician can understand where certain parts of the vehicle are located. In other instances, the information may also include a step-by-step guide in instructing how to fix the detected problem vehicle issues. Where the problem requires advanced repair that can only be achieved through the dealer's repair shop or other professional auto repair services, the information may include towing instructions or instructing how to properly shut down and stabilize the vehicle for towing.

Figure 4:
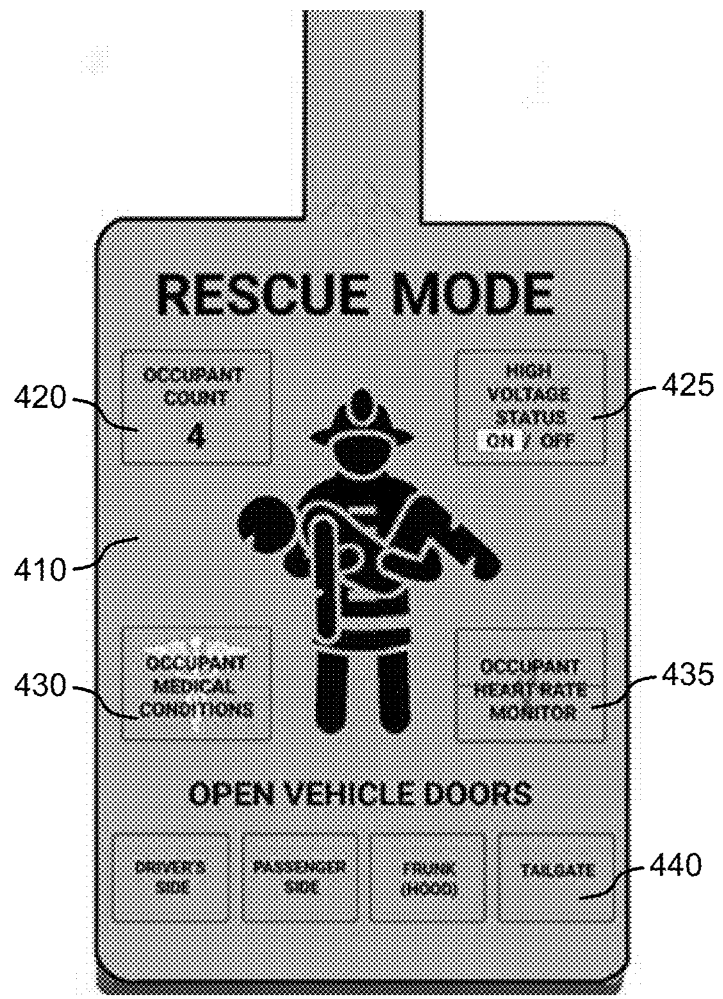
FIG. 4 illustrates a display screen with interactive elements according to one embodiment of the present disclosure.

FIG. 4 illustrates a display screen 410 displaying interactive elements according to one embodiment of the present disclosure. The display screen 410 may display touch screen buttons 420, 425, 430, 435, 440 for the user to press via the touch screen panel. Thus, select information may be presented to the user depending on the type of information the user wishes to view.

The type of interactive information presented on the display screen 410 may be dependent upon the operating vehicle mode. For example, as depicted in FIG. 4, the vehicle is operating in rescue mode, and thus the display screen 410 may present information that may be helpful for emergency responders as they first approach the vehicle at the scene of the accident. The emergency responders may then interact with the display screen 410 on the vehicle to gain valuable vehicle and occupant information that may allow them to quickly devise the best rescue plan while minimizing potential risks.

Some of the information that may be displayed on the display screen 410 may include number of occupants in the vehicle at 420. This may be achieved by utilizing a camera feed located within the cabin, where the camera feed may then be viewed on the display screen 410 upon pushing the interactive button at 420. This may allow the emergency responder to view the cabin and assess the number of occupants as well as the extent of the occupants' injuries when the vehicle's position or damage from the collision prevents the emergency responders from peering into the vehicle windows.

In other instances, the seats of the vehicle may have pressure or weight sensors, so that when the pressure senor or a certain minimum weight is detected on the seats, the vehicle determines that an occupant is present, in which the determined number of occupants is presented on the display screen 410. Thus, when a camera feed is not available within the cabin, the use of sensors may determine the number of occupants within the vehicle.

Additionally, the display screen 410 may also indicate the electrical power status of the vehicle, indicated at 425. This may allow the emergency responder to quickly determine whether it is safe for emergency personnel to approach the vehicle and whether or not emergency responders need to shut down all power from the vehicle when furthering the rescue attempt.

In other embodiments, the interactive touch screen button at 425 may be a vehicle control feature to indicate a desired setting for one or more vehicle elements, for example, high voltage lines, lighting, and seats. Controllers within the vehicle may, in turn, change the one or more vehicle elements to have the desired setting. For example, in some instances, simply touching the touch screen button may turn the vehicle's power supply on or off. This manual override of the car's power source may allow emergency responders to more quickly stabilize the car without having to open the vehicle's front hood in an attempt to locate the vehicle's power source. Rather, with a touch of a button 425, the vehicle's power may be shut down immediately so as to eliminate the vehicle's high voltage status. In some examples, touch screen button 425 and display screen 410 can be used in conjunction with vehicle components, which are configured to control elements such as vehicle power, lights, and seats. For example, display screen 410 may be used in conjunction with one or more controllers configured to control power breakers, light sources, and seat motors.

Figure 5A:
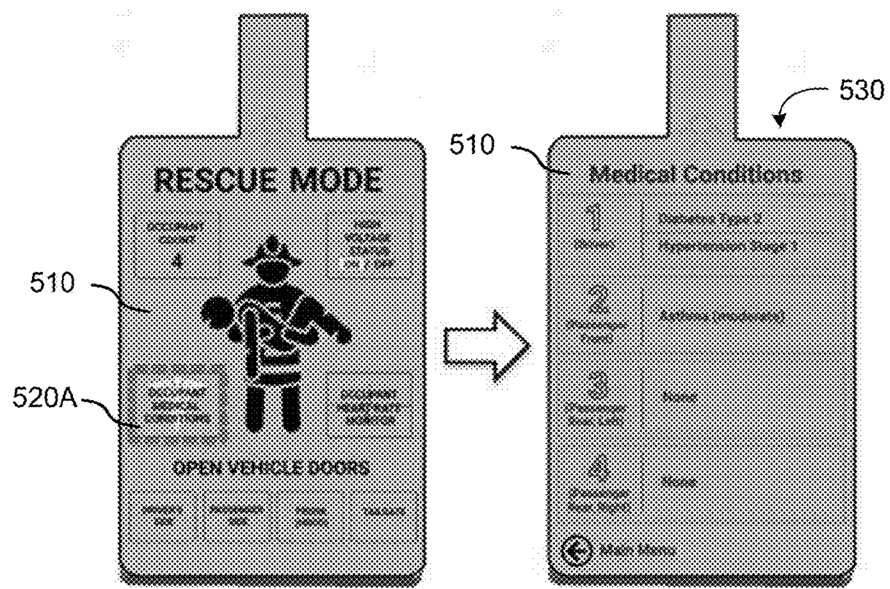
FIG. 5A illustrates a display screen with interactive elements that displays medical conditions of persons within a vehicle according to one embodiment of the present disclosure.

The display screen 410 may also provide the occupant's health and medical condition information, which is indicated at 430. Such information may provide important medical and contact information of the occupants that may be helpful to emergency responders who do not have access to the occupant's medical history or report. Exemplary medical information displayed may include a list of the occupant's allergies, medical conditions, medication history, and treatment wishes. Having access to such information will lead to faster and more effective medical treatment. As depicted in FIG. 5A, when pushing the button associated with the occupant's medical condition information at 520A, an updated screen 530 may be presented on the display screen 510. The updated screen 530 may list the medical conditions known for each of the occupants located within the vehicle.

The occupant's medical information may also be stored by manually inputting the information into the vehicle's computer system. In other instances, the information may be stored in a remote server in connection with the vehicle, where the necessary medical information is then displayed when the vehicle is in rescue mode or commanded by the occupant in the vehicle. Giving emergency responders access to such medical information will likely reduce treatment errors and allow the emergency responders to give effective medical attention.

Referring back to FIG. 4, the display screen 410 may also have an interactive feature that allows the emergency responder to view information related to the occupant's real time or monitored heart rate information. The occupant's heart rate information may be monitored by the occupant's smart watch, fitness tracker, or heart monitor device. Such devices may be coupled to the vehicle's onboard computer network or system via Bluetooth or internet connection, so that the occupant's heart rate information is accessible through the vehicle.

Figure 5B:
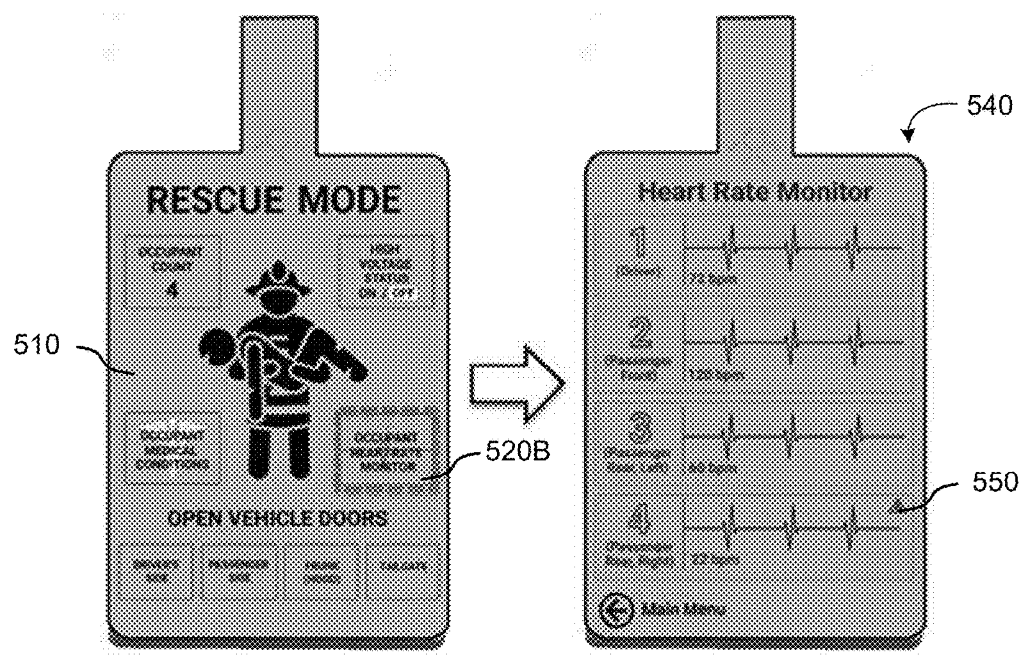
FIG. 5B illustrates a display screen with interactive elements that displays hear rate conditions of persons within a vehicle according to one embodiment of the present disclosure.

As further illustrated in FIG. 5B, when an emergency responder presses the button featuring the occupant's heart rate information at 520B, the display screen 510 may then change to display the occupant's real time heart rate information, as indicated at 540. The heart rate information of each occupant of the vehicle may be presented in real time so that the emergency responder can quickly assess the overall health of each of the occupants. In instances where an occupant's heart rate is below a certain threshold and characterized as dangerous, a warning sign 550 may be present to quickly alert the emergency responder. This feature may provide the emergency responder with quick information to determine which occupants need immediate medical attention.

Referring back to FIG. 4, the display screen 410 may also provide vehicle controls that can be controlled by the emergency responder. The display screen 410 may allow the opening of certain vehicle doors, such as the driver, passenger, hood, and tailgate doors. The display screen 410 may include buttons at 440, such that pressing the button of the appropriate door at 440 will open the desired door.

Figure 5C:
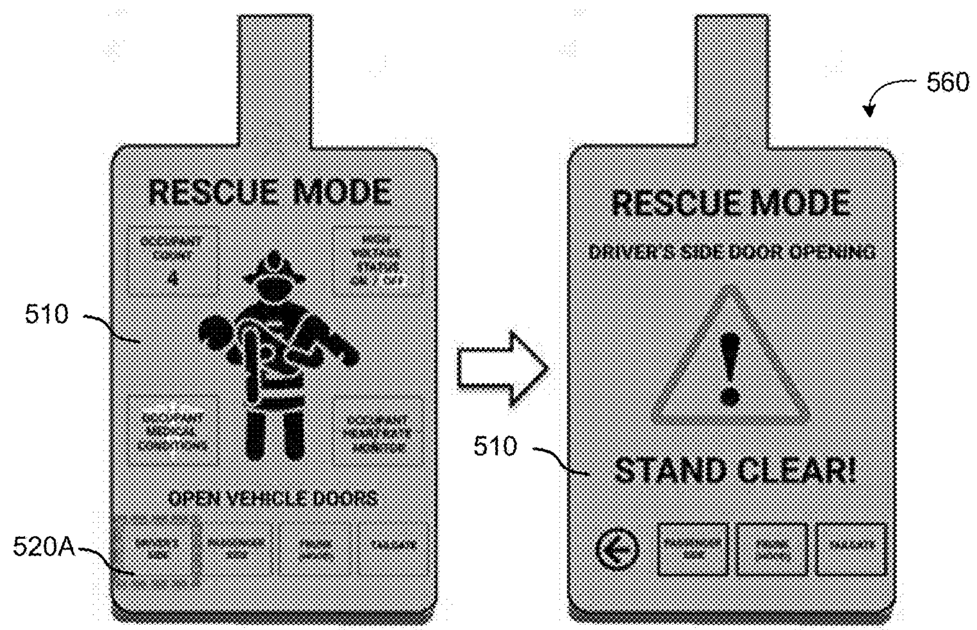
FIG. 5C illustrates a display screen with interactive elements that displays vehicle control features according to one embodiment of the present disclosure.

As illustrated at FIG. 5C, pushing the button at 520A may result in the display screen 510 to change with updated information specific to the vehicle door controls. Here, the updated screen 560 may indicate confirmation of the opening of the selected vehicle door. Additionally, a warning may be displayed on the updated screen 560, thus alerting other emergency responders or personnel to stay clear from the vehicle doors.

However, it should be noted that other vehicle controls may also be present on the display screen 510. Such vehicle controls may include enabling all interior lighting and controlling the positioning of the vehicle seats with the interactive buttons located on the display screen 510. Controlling the lighting may help emergency responders to gain visibility of the cabin, while controlling the position of the vehicle seats via a display screen may further aid emergency responders in gaining access to the occupants without having to invasively cut or remove vehicle parts when attempting to extricate occupants from the vehicle.

In some additional or alternative embodiments, the information displayed shown in FIGS. 4 and 5 may be displayed on a responder or user's portable electronic device after the responder/user scans the bar code shown in FIG. 3. The responder/user can interact by pressing the areas 420, 425, 430, 435, 440 in FIGS. 4 and 520A and 520B in FIG. 5 on the portable electronic device. The vehicle may have a computer system that is configured to allow a responder/user to connect its portable electronic device to it. Thus, the responder/user can control and operate the vehicle as discussed above on the portable electronic device through the vehicle's computer system.

In some embodiments, the bar code may also store a link to a website or information stored on a server connected to the Internet. The electronic device can scan the bar code, and access the website or information stored on the server through the link. The website or the information stored on the server may include the rescue and/or diagnosis information as described in this disclosure. The website or the information stored on the server may include additional information, such as more detail information on the vehicle, vehicle's owner, frequent occupants, etc.

In some other embodiments, the vehicle may have a memory, e.g., a hard drive, a flash memory, a random-access memory (RAM), a read-only memory (ROM), etc., and may store the rescue information and/or other pertinent information on the memory. The vehicle may also include a communications interface operatively connected with the memory, which may include Bluetooth transmitter and/or receiver, WiFi transmitter and/or receiver, or other wireless or wired communication means. When the vehicle is operating in a preset mode, for example, in a rescue mode, a repair mode, and/or other modes, the vehicle onboard computer will convert the communications interface to be a network hotspot and make the rescue information and/or other pertinent information on the memory available for browsing or downloading for the responder. The preset mode can be set by a manufacturer of the vehicle or a user. The responder can use a portable electronic device to scan the bar code as discussed above to connect to the network, and access, e.g., browse or download, the stored information through the network hotspot converted from the communications interface. In this example, scanning the bar code may serve as an authorization to connect to the network established by the hotspot. In some other embodiments, the responder may connect to the network without scanning the bar code and access the stored information through the network hotspot. In this example, the hotspot may establish a public- or free-access wireless network when the vehicle is operating in a preset mode (e.g., rescue mode), and a responder can approach the vehicle and connect an electronic device to the network to access information stored on the memory.

Figure 6:
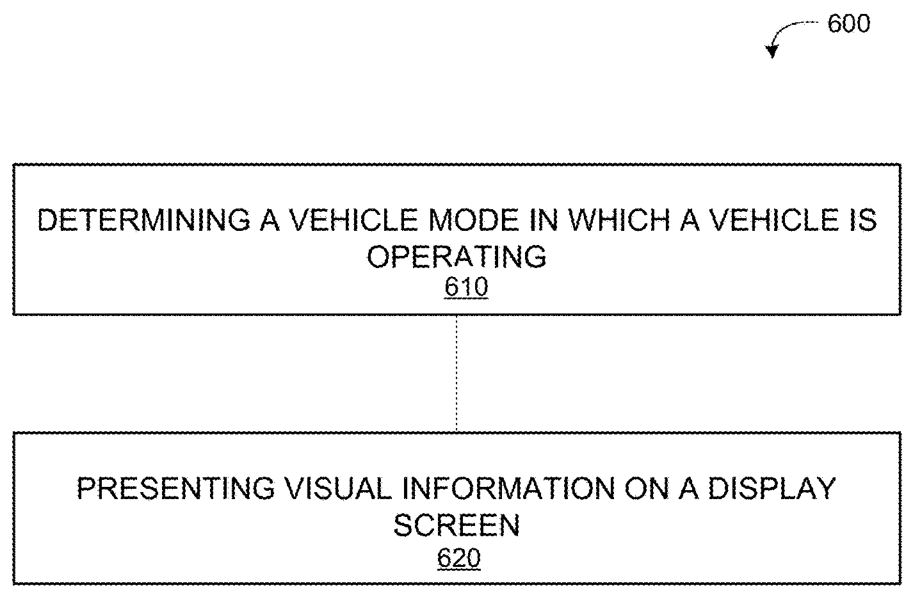
FIG. 6 illustrates a flow chart illustrating an exemplary process for displaying vehicle information according to one embodiment of the present disclosure.

FIG. 6 illustrates a flow chart illustrating an exemplary process for displaying vehicle information according to one embodiment of the present disclosure. The exemplary process begins at 600 at operation 610 determining a vehicle mode in which a vehicle is operating. The vehicle may be operating in a particular vehicle mode based on the occurrence of one more particular events associated with the vehicle. The vehicle's onboard computer and sensors may detect certain occurrences or events associated with the vehicle, and based on such information detected, specific visual information may be presented on the display screen. By way of example, particular vehicle modes may include a rescue mode when the vehicle detects imminent collision or a serious accident. Other vehicle modes may also include a repair mode, where the vehicle detects mechanical and/or electrical problems.

When the vehicle is in rescue mode, the visual information triggered to be present on the display screen may include a guide in stabilizing the vehicle for removing one or more persons in the vehicle. In the instance that the vehicle is in repair mode, the information triggered on the display screen may include step-by-step guide in diagnosing or repairing vehicle troubleshooting problems, such as any mechanical and/or electrical issues.

Next, the exemplary process may proceed to operation 620 by presenting visual information on a display screen based on the vehicle mode in which the vehicle is operating. The display screen may be installed in the vehicle such that the visual information presented on the display screen is visible from an area exterior to the vehicle. In some instances, the visual information presented on the display screen may include a matrix bar code decodable by a portable electronic device. The portable electronic device may include a matrix bar code scanner to scan the matrix bar code to decode the stored information so that it may then be presented in a way that is understandable to the viewer.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An information display system for a vehicle comprising:

a memory including predetermined vehicle information;

a communications interface configured to allow a portable electronic device to access the predetermined vehicle information in the memory based on occurrence of one or more events associated with the vehicle;

a display screen on an exterior of the vehicle, the display screen being configured to display visual instructions of how to connect the portable electronic device to the communications interface;

wherein the predetermined vehicle information includes instructions of how to stabilize the vehicle and remove one or more persons in the vehicle, and the one or more events associated with the vehicle include at least one of a sudden deceleration of the vehicle, a sudden braking of the vehicle, a yaw and roll of the vehicle, a sudden jerking of a steering wheel of the vehicle, a deployment of an air bag of the vehicle, and a force impacting a side of the vehicle.

2. The information display system of claim 1, wherein the visual instructions include a matrix bar code, the matrix bar code decodable by the portable electronic device.

3. The information display system of claim 1, wherein the display screen is installed on an exterior surface of a B-pillar structural support of the vehicle.

4. The information display system of claim 1, wherein the display screen is coupled to a power source, which provides power for the display screen, the power source being separate from a primary vehicle power source.

5. The information display system of claim 1, wherein the communications interface is further configured to allow the portable electronic device to access vehicle sensor information.

6. The information display system of claim 5, wherein the vehicle sensor information includes at least one of an occupant count, a high voltage status, an occupant medical condition information, or an occupant heart rate monitor data.

7. The information display system of claim 1, wherein:

the memory further includes one or more vehicle settings; and the communications interface is further configured to allow the portable electronic device to access and change the vehicle settings.

8. The information display system of claim 7, wherein the vehicle settings include a high voltage power state.

9. The information display system of claim 1, wherein the communications interface is configured to be converted to a network hotspot and the predetermined vehicle information in the memory is accessed through the network hotspot.

10. The information display system of claim 9, wherein the visual instructions of how to connect the portable electronic device to the communications interface include instructions of how to connect the portable electronic device to the network hotspot.

11. The information display system of claim 10, wherein the display screen comprises a touch-sensitive screen, and the visual instructions comprise a touch-sensitive button.

12. A method for displaying vehicle information, the method comprising:

determining a vehicle mode in which a vehicle is operating based on occurrence of one or more events associated with the vehicle, upon determining the vehicle mode, displaying, on a display screen on an exterior of the vehicle, visual instructions of how to connect a portable electronic device to a communications interface;

upon connection of the portable electronic device to the communication interface, allowing the portable electronic device to access predetermined vehicle information in a memory;

the predetermined vehicle information includes instructions of how to stabilize the vehicle and remove one or more persons in the vehicle, and the one or more events associated with the vehicle include at least one of a sudden deceleration of the vehicle, a sudden braking of the vehicle, a yaw and roll of the vehicle, a sudden jerking of a steering wheel of the vehicle, a deployment of an air bag of the vehicle, and a force impacting a side of the vehicle.

13. The method of claim 12, wherein displaying the visual instructions includes displaying a matrix bar code, and connecting the portable electronic device to the communication interface includes decoding the matrix bar code by the portable electronic device.

14. The method of claim 12 wherein the memory further includes one or more vehicle settings, and the method further comprises changing the one or more vehicle settings in response to a user input on the portable electronic device.

* * * * *